United States Patent [19]

Greubel

[11] Patent Number: 4,596,154

[45] Date of Patent: Jun. 24, 1986

[54] TESTING PROCEDURE AND APPARATUS FOR MANUFACTURING OF ELECTRICAL DRIVES WITH LOW OUTPUT RPM

[75] Inventor: Peter Greubel, Bad Kissingen, Fed. Rep. of Germany

[73] Assignee: Siemens Aktiengesellschaft, Munich and Berlin, Fed. Rep. of Germany

[21] Appl. No.: 649,387

[22] Filed: Sep. 11, 1984

[30] Foreign Application Priority Data

Sep. 22, 1983 [DE] Fed. Rep. of Germany ....... 3334363

[51] Int. Cl.⁴ .............................................. G01L 5/00
[52] U.S. Cl. .............................. 73/862.08; 73/862.09
[58] Field of Search ........... 73/862.08, 862.09, 862.19, 73/1 C, 862, 862.12

[56] References Cited

U.S. PATENT DOCUMENTS

| | | | |
|---|---|---|---|
| 2,614,417 | 10/1952 | Cockrell et al. | 73/862.19 |
| 2,648,219 | 8/1953 | Emery | 73/1 C |
| 3,210,992 | 10/1965 | Lacy et al. | 73/862.12 |
| 3,402,600 | 9/1968 | Athey | 73/862.09 |
| 3,475,952 | 11/1969 | Schmalbruch | 73/862.08 |

*Primary Examiner*—Charles A. Ruehl
*Attorney, Agent, or Firm*—F. W. Powers; J. L. James

[57] ABSTRACT

Method and apparatus for testing electrical drive mechanism. A dog plate engages each drive and the drive is energized to rotate a pulley coupled to the dog plate. A weight is attached to the pulley by means of a cable. A controller energizes the drive, measures the torque output, and the speed and current input to the drive.

8 Claims, 2 Drawing Figures

TESTING PROCEDURE AND APPARATUS FOR MANUFACTURING OF ELECTRICAL DRIVES WITH LOW OUTPUT RPM

BACKGROUND OF THE INVENTION

The present invention relates to test methods and apparatus, and more particularly to a test procedure and testing apparatus for the manufacturing control of electrical drives with low output RPM. Such drives may, for instance, be of the type used for automotive window lifters and provided with a high ratio reduction gear. In one previously-used approach, the free end of a rope or cable carrying a weight is wound around a pulley in the direction of rotation, as many times as is needed, making use of friction between the surface of the pulley and the rope to establish a load. When testing the drive in the opposite direction, the direction in which the rope is wound must be changed accordingly.

In the previously used procedure, measurement of drive current has been carried out with commercially available ammeters; the low output RPM has been checked with hand tachometers and the direction of rotation monitored by visual inspection. For measuring torque, a rope was attached to a fixed spring scale and the free end wound around the surface of the pulley at the running test as many times as was necessary to produce sufficient friction to stop the rotation of the pulley. The force on the spring scale was then read and the braking torque calculated. As much of it is manual, such a procedure is inherently slow and subject to inaccuracy. Accordingly, it will be seen that it would be advantageous to render the testing of electrical drives with low output RPM as extensively automatic as possible and without loss of time.

It is therefore an object of the invention to provide an improved means and method for the testing of low-speed electrical drives.

It is another object of the invention to provide an efficient and automatic means for testing low-speed drives including high ratio gear reduction systems.

SUMMARY OF THE INVENTION

Briefly stated, in acordance with one aspect of the invention, the foregoing objects are achieved by providing a pulley and means for engaging the pulley to a drive under test. A cable having a weight at one end is attached to the pulley and the drive is energized. As the drive turns the pulley, raising the weight, the effective lever arm provided by the pulley increases, requiring more torque from the tested drive. The current drawn by the drive and the speed and rotation thereof are monitored by a controller and the operating characteristics of the tested drive are determined.

BRIEF DESCRIPTION OF THE DRAWINGS

While the specification concludes with claims particularly pointing out and distinctly claiming the subject matter which is regarded as the invention, it is believed that the invention will be better understood from the following description of a preferred embodiment taken in conjunction with the accompanying drawings in which:

DESCRIPTION OF A PREFERRED EMBODIMENT

Figure 1:
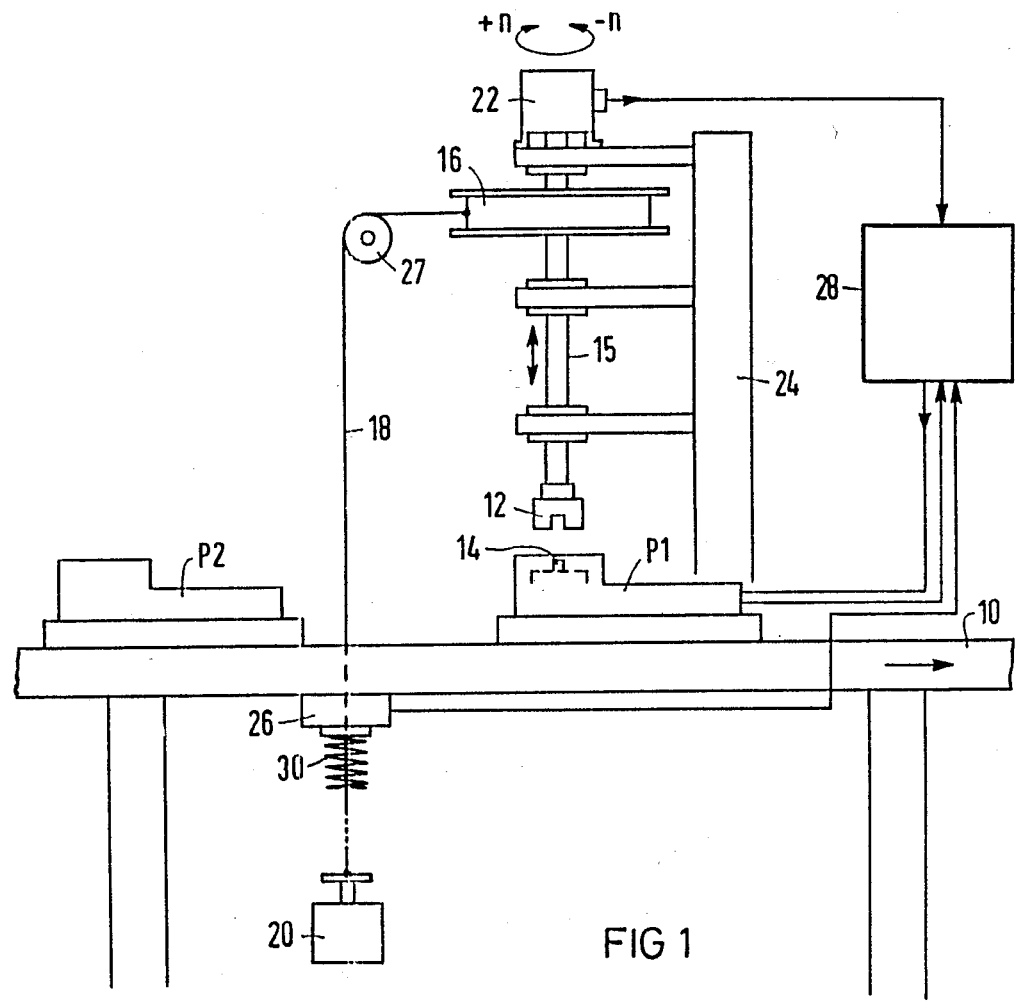
FIG. 1 illustrates a test arrangement according to the present invention.
Figure 2:
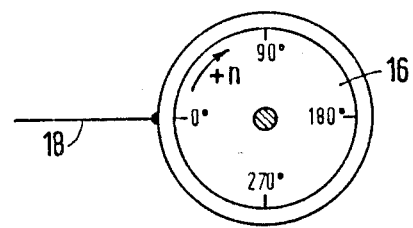
FIG. 2 shows the orientation of a rotating member of the apparatus in FIG. 1.

In accordance with FIG. 1, test pieces P1 and P2, which may comprise motor vehicle window lifter drives are transported toward an assembly area on a conveyor belt 10 in the direction as shown by arrow, to a testing device located above the conveyor belt. The testing device comprises a dog plate 12 which can be readily coupled to the output shaft 14 of the drive under test, here illustrated as P1.

A pulley 16 is connected with the dog plate 12 so that they are connected to turn together. A cable 18 has one end coupled to the pulley while at the other end a weight 20 is attached, to provide loading to the cable. A synchro transmitter 22 is connected to the upper end of shaft 15 for producing speed and angular position signals, the combination being supported by support frame 24.

A pulley 27 allows cable 18 to move in a desired path. Every incremental rotation in the same direction of the pulley 16 can be stopped, at the latest after one full turn, by a signal from a pressure measuring device 26, against which the weight 20 is pulled.

As can be seen from FIG. 1, dog plate 12 is directly connected with the pulley 16 through drive shaft 15 and with the synchro transmitter 22. Drive P1 is connected to synchro transmitter 22 and to a controller 28 from which the characteristic values of the weight loaded start of the drive P1, and the braking torque thereof, can be ascertained.

The drive shaft 15 is arranged vertically and is adjustable in structure 24 for the purpose of engaging or disengaging the driven shaft 14 of the test piece. In contrast to previously used solutions, the cable 18 is connected to the pulley 16 and at the turning of the pulley 16 wraps around the pulley, being led over the guide pulley 27 perpendicularly to the pressure measuring device 26 affixed underneath the conveyor 10.

The fully automatic testing of the test pieces occurs as follows. At the end of the assembly section for the window lifters, the test arrangement consisting of pulley 16, cable 18, guide pulley 27 and weight 20 are moved downward until the dog plate 12 engages the output shaft 14 of the test piece P1, which is properly positioned on the conveyor belt 10. At the same time, the electrical drive of the test piece P1 is automatically energized by a signal from controller 28 so that the drive can start to run up from its initial position. The upper end of cable 18 is connected to the pulley 16 in such a way that in its initial position, no leverage exists between force of the cable and the axis of the pulley 16. At first, between the angle positions 0 and 90 degrees, the impulses of the transmitter 22 are used to determine the rotating direction of the test piece P1. At the 90 degree position the test piece is loaded with its maximum torque, since the effective lever arm between the axis of the pulley 16 and the cable attachment point has reached its maximum length. The ever arm and weight are adjusted to each other in such a manner that the proper loading torque for the test piece P1 is assured.

At the 90 degree position, the rotation of the output shaft 14 of the test piece P1, the drive shaft 15 and the pulley 16 are briefly stopped by electrical disconnection of P1. Due to the self-locking aspect of the worm gear of the test piece P1 under test in one experiment, no special measures for the return braking are necessary. After reconnecting the test piece P1 to the power supply it must then run against the defined higher load and the starting torque under load can be checked. Further, a steadying interval is provided until arriving at the 180 degree position during which, for instance, current peaks can be smoothed out and the motor reaches its nominal R.P.M. From the 180 degree to the 270 degree position the controller conducts a time measurement for the run through this angle sector and calculates and tests the RPM of the test piece P1 during its normal operation. Controller 28 also records the current flow to P1.

From the 270 degree position, the drive of the test piece P1 and therewith pulley 16 continue to turn until the loading weight 20 reaches a cushioning stop at spring 30 and has compressed it. In this position further motion of the drive of test piece P1 is blocked. The stop is sensed by the transmitter 22 and a signal produced; after that, the pressure on the pressure measuring device 26 is recorded by the controller 28. This pressure is proportional to the closing force on the window in the motor vehicle, while the weight of the window and the friction to be overcome at the time of window closing are represented by the pull weight 20. From this measured closing force F, which is advantageously passed on to the controller as pressure value U=f (F) of the sensing unit 26, the controller computes the brake torque with reference to the effective lever arm between the cable and pulley. The length of the cable 18 is adjusted so that both at the start of the procedure, and subsequently during the rotating of pulley 16 from its initial or zero degree position, the load is already known through the value of weight 20; and that the drive prior to or upon reaching the 360 degree position is cut off as a result of the pressure of the pull weight 20 against pressure measuring device 26.

Following this, at a signal from controller 28, the rotation of the test piece P1 is reversed; the output shaft of the test piece and dog plate 12 and thus the drive shaft 15, pulley 16 and the transmitter 22 all rotate in the opposite direction, after which the testing of test piece can be repeated, this time in the opposite direction. After completion of the automatically performed measurements in both directions, the loading mechanism is moved upwards by pneumatic or other means until the dog plate 12 releases the output shaft of the test piece P1 and test piece P1 can leave the test bench.

It will readily be understood by those skilled in the art that controller 28 may comprise any one of a number of commerically available units, preferably of the programmable type, for outputting and accepting signals from a testing process. Controller 28 is programmed or adjusted to accomodate the following:
a. Start up time of test piece against a pre-set load.
b. Recording of the current input, direction of rotation and output RPM of the test piece under load.
c. Recording of the braking torque of the test piece, corresponding in the present illustration to the closing power of a window lifter drive in a motor vehicle while closing a window.

The test values in both directions of rotation should be recorded as quickly as possible. The solution to this task is achieved by starting from a test procedure of the type mentioned at the beginning of this description, in line with the invention.

The testing device based on the invention permits, e.g., only one revolution of the output shaft of the test piece, the execution of the testing in one direction of rotation to take place. By merely reversing of the direction of rotation the test piece can be checked without the necessity of a changeover of the testing device. In its reverse mode, the control of the testing interval and the evaluation of the test results is preferably carried out by a microprocessor typically utilized in a modern programmable controller although older-style relay operated controllers will suffice. The adjustment to the necessary angle position of the pulley and to the output shaft coupled to it is transmitted to the controller in a suitable way by a reversible gear, preferably with an incremental sensor which is coupled to the drive shaft and is used at the same time as indicator of the direction of rotation.

The following steps illustrate the test procedure which is to be accomplished automatically. Starting from a 0 degree position of the pulley, which is only loaded by weight 20 times the sine of the angle turned from 0 degrees, the measuring steps are as follows:
(a) Check direction of rotation in the arc 0 to 90 degree.
(b) At the 90 degree position the drive is stopped for a moment.
(c) Immediately after restarting, check the starting conditions, i.e. run-up under load.
(d) After a steadying interval, calculate the rated speed in the arc from 270 degree to 360 degree based upon a measured time interval.
(e) After braking in the arc from 270 degree to 360 degree and after stopping motor 22 the pulling force of the braked and pull-weight loaded drive are measured and the brake torque calculated.

As will be evident from the foregoing description, certain aspects of the invention are not limited to the particular details of the examples illustrated, an it is therefore contemplated that other modifications or applications will occur to those skilled in the art. It is accordingly intended that the claims shall cover all such modifications and applications as do not depart from the true spirit and scope of the invention.

What is claimed as new and desired to be secured by Letters Patent of the United States is:

1. The method of testing the output of a rotatable, torque-producing apparatus comprising the steps of:
providing a pulley means for engaging the apparatus;
coupling a weight to the pulley means in an initial position such that no torque is exerted on the apparatus;
actuating the apparatus;
measuring the rotation of the pulley means in response to the actuation of the apparatus; and
measuring current flow to the apparatus occuring while the pulley means is being rotated.

2. A method according to claim 1, further including the steps of:
providing a cable with a first end connecting to the pulley means and a second end connecting to the weight for coupling the weight to the pulley means;
collecting the first end of said cable around the pulley means as said pulley means rotates thereby raising the weight connected to the second end; and
sensing the position of the weight at the second end of said cable and terminating operation of the apparatus when said weight is raised to a predetermined position.

3. A method according to claim 2, further including the step of:
causing said apparatus to reverse its direction of rotation, returning said pulley means to its original position and continuing the rotation thereof for again raising said weight by collecting the first end of said cable around the pulley means; and cutting off the operation of said apparatus when said weight attains the same, predetermined position.

4. Testing means for testing the operation of a torque-producing electrical apparatus having a rotatable output, comprising:

means for engaging the rotatable output;

means for applying current to the apparatus in a controlled manner;

a test weight;

pulley means coupled to said means for engaging;

cable means having a first end coupled to said pulley means and second end to said test weight;

a first transducer coupled to said pulley means for determining the angular rotation thereof;

a second transducer for sensing the height of said weight and producing an output;

controller means for supplying current to said apparatus and for measuring said current in relation to the angular disposition of said pulley means; and means responsive to said second transducer output for terminating current flow to said apparatus when said weight attains a predetermined height.

5. A testing device according to claim 4, wherein:

said controller means is responsive to the attainment by said weight of said predetermined height for causing said apparatus to reverse its rotation, whereby said pulley is rotated in a second, opposite direction for lowering said weight and again raising said weight, and said controller means further monitors the rotation of said pulley and flow of current during said opposite direction.

6. Testing means for testing the operation of a torque-producing electrical apparatus having a rotatable output, comprising:

means for engaging the rotatable output;

means for applying current to the apparatus in a controlled manner;

a test weight;

pulley means coupled to said means for engaging;

cable means having a first end coupled to said pulley means and second end to said test weight;

a first transducer coupled to said pulley means producing an output for determining the angular rotation thereof;

a second transducer for sensing the height of said weight and producing an output;

controller means for supplying current to said apparatus and for measuring said current in relation to the angular disposition of said pulley means; and means responsive to said first transducer output for terminating current flow to said apparatus when said weight provides maximum torque on said pulley means.

7. A testing device according to claim 6, further including means responsive to said second transducer output for terminating current flow to said apparatus when said weight attains a predetermined height.

8. A testing device according to claim 7, wherein said controller means after terminating current flow when said weight provides maximum torque on said pulley means for an interval, reapplies current flow to the apparatus until said means responsive to said second transducer output terminates the current flow.

* * * * *